US012719086B2

(12) United States Patent
Wu et al.

(10) Patent No.: US 12,719,086 B2
(45) Date of Patent: Aug. 25, 2026

(54) METHOD FOR PREPARING SEI-LIKE FILM COMPONENT ADDITIVE AS WELL AS ELECTROLYTE SOLUTION, LITHIUM-ION BATTERY, BATTERY MODULE, BATTERY PACK AND POWERED DEVICE

(71) Applicant: CONTEMPORARY AMPEREX TECHNOLOGY (HONG KONG) LIMITED, Hong Kong (CN)

(72) Inventors: Zeli Wu, Ningde City (CN); Changlong Han, Ningde City (CN); Lei Huang, Ningde City (CN); Zhiyong Ai, Ningde City (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 18/321,794

(22) Filed: May 23, 2023

(65) Prior Publication Data

US 2023/0299356 A1 Sep. 21, 2023

Related U.S. Application Data

(63) Continuation of application No. PCT/CN2021/101835, filed on Jun. 23, 2021.

(51) Int. Cl.

*H01M 10/0567* (2010.01)
*H01M 10/0525* (2010.01)
*H01M 10/0569* (2010.01)

(52) U.S. Cl.

CPC ... *H01M 10/0567* (2013.01); *H01M 10/0525* (2013.01); *H01M 10/0569* (2013.01);

(Continued)

(58) Field of Classification Search

CPC ......... H01M 10/0525; H01M 10/0567; H01M 10/0569; H01M 2300/0042; H01M 2300/0051; H01M 2220/20

See application file for complete search history.

(56) References Cited

U.S. PATENT DOCUMENTS 5,316,875 A 5/1994 Murai et al.
2007/0117012 A1* 5/2007 Xiao ................ H01M 10/0567 429/340

(Continued)

FOREIGN PATENT DOCUMENTS

CN 106898819 A 6/2017
CN 107919473 A 4/2018

(Continued)

OTHER PUBLICATIONS

International Search Report received in the corresponding International Application PCT/CN2021/101835, mailed Oct. 20, 2021.

(Continued)

*Primary Examiner* — Osei K Amponsah
(74) *Attorney, Agent, or Firm* — K&L Gates LLP

(57) ABSTRACT

A method for preparing an SEI (solid electrolyte interphase)-like film component additive, and an electrolyte solution comprising the SEI-like film component additive prepared by the method are provided. Compared with a conventional electrolyte solution (electrolyte solution without adding SEI-like film component additive), the electrolyte solution of the present application can prevent the loss of the effective ingredients caused by the dissolution of the SEI film on the negative electrode in the electrolyte solution during battery storage and use, and the electrolyte solution of the present application can also timely supplement the lost or (Continued)

damaged SEI film with effective ingredients, so that the damaged parts of the SEI film are quickly and timely supplemented.

11 Claims, 3 Drawing Sheets

(52) U.S. Cl.
CPC .................. *H01M 2220/20* (2013.01); *H01M 2300/0042* (2013.01); *H01M 2300/0051* (2013.01)

(56) References Cited

U.S. PATENT DOCUMENTS

| | | | | |
|---|---|---|---|---|
| 2009/0311611 | A1* | 12/2009 | Wu | H01M 4/622 429/338 |
| 2019/0140321 | A1* | 5/2019 | Ahn | H01M 10/0568 |
| 2022/0181694 | A1* | 6/2022 | Nagaya | H01M 10/0568 |

FOREIGN PATENT DOCUMENTS

| | | | |
|---|---|---|---|
| CN | 107946538 | A | 4/2018 |
| CN | 110120496 | A | 8/2019 |
| CN | 112490506 | A | 3/2021 |
| JP | 2016146329 | A | 8/2016 |
| JP | 2017204364 | A | 11/2017 |
| JP | 2018181420 | A | 11/2018 |
| JP | 2021048121 | A | 3/2021 |
| WO | 2018123330 | A1 | 7/2018 |

OTHER PUBLICATIONS

The extended European search report received in the corresponding European Application 21946271.0, mailed on Sep. 8, 2023.
Nie Mengyun et al: "Lithium Ion Battery Graphite Solid Electrolyte Interphase Revealed by Microscopy and Spectroscopy", The Journal of Physical Chemistry C, vol. 117, No. 3, Jan. 24, 2013 (Jan. 24, 2013), pp. 1257-1267.
Notice of Reasons for Refusal received in the corresponding Japanese Application 2023-501449 mailed on Dec. 22, 2023.
The First Office Action received in the counterpart CN application 202180068436.2, dated Jul. 3, 2025, 17 pages with English translation.

* cited by examiner

A

B

METHOD FOR PREPARING SEI-LIKE FILM COMPONENT ADDITIVE AS WELL AS ELECTROLYTE SOLUTION, LITHIUM-ION BATTERY, BATTERY MODULE, BATTERY PACK AND POWERED DEVICE

CROSS-REFERENCE TO RELATED APPLICATIONS

The present application is a continuation of International Application PCT/CN2021/101835, filed Jun. 23, 2021 and entitled "METHOD FOR PREPARING SEI-LIKE FILM COMPONENT ADDITIVE AS WELL AS ELECTROLYTE SOLUTION, LITHIUM-ION BATTERY, BATTERY MODULE, BATTERY PACK AND POWERED DEVICE", which is incorporated herein by reference in its entirety.

TECHNICAL FIELD

The present application relates to the field of electrochemistry, and in particular to a method for preparing an SEI (solid electrolyte interphase)-like film component additive, as well as an electrolyte solution comprising the SEI-like film component additive prepared by the method, a lithium-ion battery, a battery module, a battery pack, and a powered device comprising the same.

BACKGROUND ART

With the rapid development of new energy fields, lithium-ion batteries are widely used in various large power plants, energy storage systems and various consumer products, especially in the field of new energy vehicles such as all-electric vehicles and hybrid electric vehicles by virtue of their excellent electrochemical performance, memoryless effect, less environmental pollution and other advantages.

During the first charging of a lithium-ion battery, electrolyte solvent and lithium salt will form an SEI (solid electrolyte interphase) film on the surface of negative electrode, which is of great importance for the functioning of the electrochemical performance of lithium ions. However, during battery storage or use, the effective components of the SEI film are not stably present, and when the structure of the SEI film itself is damaged, the stability at the interphase between the negative electrode active material and the electrolyte solution will be damaged, side reactions inside the battery will be intensified, and the cycling performance and safety performance of the battery will be adversely affected. However, the SEI film consumes the electrolyte solution and a large amount of lithium ions during its formation, thereby reducing the charge-discharge efficiency of the battery and causing the accelerated degradation of battery capacity. A large amount of gas generated during the formation of the SEI film also affects the safety performance of the battery.

Therefore, it will be of great significance to the improvement of battery performance if a method for preparing SEI-like film component additive can be developed, and the SEI-like film component additive prepared by the method can be added to the electrolyte solution, so as to timely supplement or restore the damaged SEI film when the SEI film is structurally damaged or the SEI film is consumed.

SUMMARY OF THE INVENTION

The present application has been made in view of the above-mentioned topics, and an object is to provide a method for preparing an SEI-like film component additive, as well as an electrolyte solution comprising the SEI-like film component additive prepared by the method, a lithium-ion battery, a battery module, a battery pack, and a powered device comprising the same.

A first aspect of the present application provides a method for preparing an SEI-like film component additive, comprising the steps of:

- Reacting an organic solution of lithium naphthaienide with a mixed solvent in an inert gas atmosphere to obtain a mixture containing an SEI-like film component additive, wherein,
- the mass ratio of the lithium naphthaienide in the organic solution of lithium naphthalenide to the mass of the mixed solvent is 2-8:1, and the mixed solvent comprises an organic solvent for a battery electrolyte solution
- drying the mixture in vacuum to obtain the SEI-like film component additive.

In any of embodiments, the mixed solvent comprises one or more of cyclic esters, linear esters, cyclic sulfones and linear sulfones.

In any of embodiments, the mixed solvent is a mixture of ethylene carbonate, methyl ethyl carbonate, and dimethyl carbonate.

In any of embodiments, based on the mass of the mixed solvent, ethylene carbonate is used in an amount of 20%-30%, methyl ethyl carbonate is used in an amount of 30%-40%, and dimethyl carbonate is used in an amount of 30%-50%, with the total amount being 100%.

In any of embodiments, the reaction temperature W1 and the reaction time S1 of the organic solution of lithium naphthalenide with the mixed solvent satisfy the condition of $23.59\text{K}\cdot\text{min} \leq \ln(W1+273.15)\times\ln S1 \leq 30.16\text{K}\cdot\text{min}$; and the reaction is preferably carried out with sufficient stirring.

In any of embodiments, the reaction temperature W1 of the organic solution of lithium naphthalenide with the mixed solvent is 45-60° C., and the reaction time S1 is 60-180 minutes.

In any of embodiments, the organic solution of lithium naphthalenide is prepared as follows:

Adding a lithium metal to an organic solvent containing naphthalene in an inert gas atmosphere to react the naphthalene with the lithium metal, wherein the molar ratio of the naphthalene to the added lithium metal is 1-3:1, and during the reaction, the reaction temperature W2 and the reaction time S2 of the naphthalene with the lithium metal satisfy the condition of $23.59\ \text{K}\cdot\text{min} \leq \ln(W2+273.15)\times\ln S2 \leq 30.16\text{K}\cdot\text{min}$; and the reaction is preferably carried out with sufficient stirring.

In any of embodiments, the reaction temperature W2 of the naphthalene with the lithium metal is 45-60° C., and the reaction time S2 is 60-180 minutes.

In any of embodiments, in the organic solution containing naphthalene, the molar ratio of the organic solvent to the naphthalene is 1-5:1, and the organic solvent is selected from one or more of ethylene glycol dimethyl ether, ethylene glycol diethyl ether, ethylene glycol dipropyl ether, ethylene glycol methyl ethyl ether, and ethylene glycol methyl propyl ether.

In any of embodiments, the drying temperature of the mixture in vacuum is 60-80° C.; and optionally, the resulting SEI-like film component additive is a solid.

A second aspect of the present application provides an electrolyte solution comprising the SEI-like film component additive prepared according to the method of the first aspect of the present application.

In any of embodiments, the SEI-like film component additive is added in an amount of 0.05-0.3% by mass of the electrolyte solution.

In any of embodiments, the electrolyte solution contains a lithium-supplying material, and the mass ratio of the added amount of the SEI-like film component additive to the lithium-supplying material is 0.5-5:100; optionally, the lithium-supplying material is one or more of lithium hexafluorophosphate, lithium difluorophosphate, and lithium tetrafluoroborate.

the electrolyte solution contains other additive in a mass of 0.5%-3% of the mass of the electrolyte solution; optionally, the other additive is selected from one or more of fluoroethylene carbonate, vinylene carbonate, vinyl ethylene carbonate, and ethylene sulfate.

A third aspect of the present application provides a lithium-ion battery comprising a positive electrode sheet, a separator, a negative electrode sheet and the electrolyte solution according to the second aspect of the present application, wherein the negative electrode sheet comprises a negative electrode film layer, the negative electrode film layer comprises a negative electrode active material, and the negative electrode active material comprises one or more of natural graphite, artificial graphite; mesocarbon microbead, hard carbon, soft carbon, silicon-carbon composite, lithium-tin alloy and lithium-aluminum alloy.

In any of embodiments, assuming that the mass percentage of the added amount of the SEI-like film component additive in the electrolyte solution is m1, and the mass of the negative electrode active material on a single-sided negative electrode current collector (in g/77 $mm^2$) is m2, then the ratio of m1 to m2 is 1.1-2.8 $(g/77\ mm^2)^{-1}$.

In any of embodiments, when the positive electrode material is one of those of lithium iron phosphate system, the charging cut-off voltage of the lithium-ion battery can reach 3.65-3.8V; and when the positive electrode material is one of those of nickel-cobalt-manganese ternary system, the charging cut-off voltage of the lithium-ion battery can reach 4.0-4.8V.

A fourth aspect of the present application provides a battery module comprising the lithium-ion battery described in the third aspect of the present application. The battery module can be prepared using a method known in the prior art for preparing a battery module.

A fifth aspect of the present application provides a battery pack comprising one or more of the lithium-ion battery of the third aspect of the present application or the battery module of the fourth aspect of the present application. The battery pack can be prepared using a method known in the prior art for preparing a battery pack.

A sixth aspect of the present application provides a powered device comprising one or more of the lithium-ion battery of the third aspect of the present application, the battery module described in the fourth aspect of the present application or the battery pack of the fifth aspect of the present application, wherein the lithium-ion battery or the battery module or the battery pack is used as a power source for the powered device or an energy storage unit for the powered device. The powered device can be prepared using a method known in the prior art for preparing a powered device.

Beneficial Effects

The method for preparing the SEI-like film component additive described in the present application is simple in operation and easy for industrial application. By adding the SEI-like film component additive prepared according to the method of the present application into a conventional electrolyte solution, on the one hand, the dissolution of the SEI film by the electrolyte solution during storage or use of the lithium-ion battery can be slowed down or avoided, and the consumption of the SEI film can be reduced, thereby maintaining the stability at the interphase between the SEI film and the electrolyte solution, and in turn avoiding the deterioration of the cycling performance and safety performance of the battery due to the continuous consumption of the electrolyte solution; and on the other hand, when the SEI film is inevitably consumed due to abnormal conditions such as high temperature or high pressure, the SEI-like film component additive described in the present application can rapidly form a new SEI film, and timely supplement the damaged SEI film, thereby maintaining the cycling performance and safety performance of the battery at the same level as that when the SEI film is never damaged.

The battery module, battery pack and powered device of the present application comprise the lithium-ion battery provided by the present application, and thus have at least the same advantages as that of the lithium-ion battery.

DESCRIPTION OF REFERENCE NUMERALS

Figure 1:
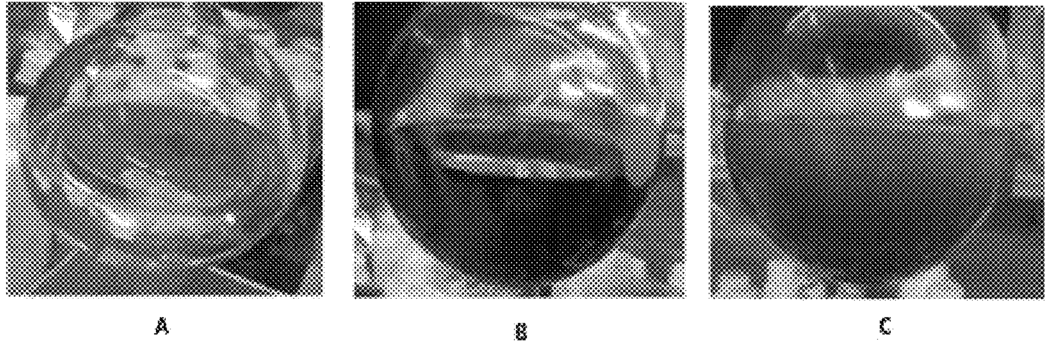
In FIG. 1, A-C respectively correspond to the state diagrams of the organic solution containing naphthalene, the organic solution of lithium naphthalenide and the mixture containing the SEI-like film component additive during the preparation of the SEI-like film component additive involved in Example 1 of the present application.
Figure 2:
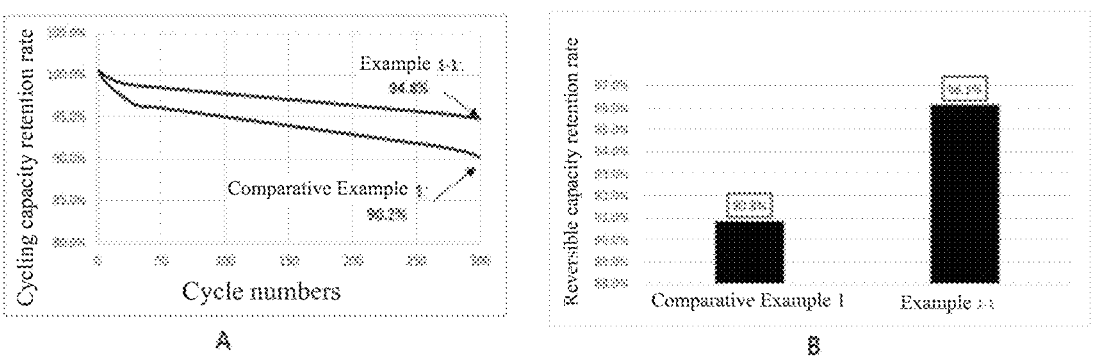
FIG. 2 is the 60° C. cycling performance diagram (FIG. 2.A) and 60° C. storage performance diagram (FIG. 2.B) of the batteries corresponding to the electrolyte solutions of Example 1-1 and Comparative Example 1 of the present application at 3.65V.

1 Battery pack
2 Upper box
3 Lower box

4 Battery module
5 Lithium-ion battery
51 Case
52 Electrode assembly
53 Top cover assembly

DETAILED DESCRIPTION

Hereinafter, the method for preparing the SEI-like film component additive, as well as the electrolyte solution comprising the SEI-like film component additive prepared by the method, the lithium-ion battery, the battery module, the battery pack, and the powered device comprising the same will be described in detail and specifically disclosed with reference to the accompanying drawings, however, there may be cases where unnecessary detailed description is omitted. For example, in order to avoid unnecessary redundancy in the following descriptions and to facilitate the understanding of those skilled in the art, there are cases where detailed descriptions of well-known items and repeated descriptions of actually identical structures are omitted. In addition, the accompanying drawings and subsequent descriptions are provided for those skilled in the art to fully understand the present application, and are not intended to limit the subject matter recited in the claims.

For the sake of brevity, the present application specifically discloses some numerical ranges, and various numerical ranges can be combined with each other to form corresponding embodiments. Any lower limit can be combined with any upper limit to form a range not explicitly recited; and any lower limit can be combined with another lower limit to form a range not explicitly recited, and likewise, any upper limit can be combined with any another upper limit to form a range not explicitly recited. In addition, each individually disclosed point or individual numerical value can itself be used as a lower limit or an upper limit to combine with any another point or individual numerical value or with another lower limit or upper limit to form a range not explicitly recited.

Unless otherwise stated, the terms used herein have the well-known meanings commonly, understood by those skilled in the art. In the present application, unless otherwise stated, "or more" and "or less" encompass the recited number; for example, "one or more of a and b" refers to at least one of a and b. e.g. a, b, or a and b. Likewise, "one or more" is meant to comprise at least one. In the description herein, unless otherwise staled, the term "or" is inclusive, that is, the phrase "A or B" means "A, B, or both A and B".

In the present application, the "SEI-like film component additive" refers to the product resulting from the reaction of the organic solution of lithium naphthalenide with the mixed solvent described herein. Since the product can slow down or avoid the damage of the SEI film after being added to the electrolyte solution, thus significantly improving the cycling performance and safety performance of the battery, and since the reaction product functions similarly to the SEI film component, for the convenience of description, it is figuratively referred to herein as "SEI-like film component additive". It should be noted that the reaction of the organic solution of lithium naphthalenide with the mixed solvent is comparatively complicated, and the product may contain a variety of components. However, the present application is not intended to explore which components are specifically included in the SEI-like film component additive and the content of each component, it rather aims to study the method for preparing the SEI-like film component additive, as well as the cycling performance and safety performance of the battery using the electrolyte solution containing the SEI-like film component additive prepared by the method of the present application.

During the first charging of the lithium-ion battery, the electrolyte solution and lithium salt will undergo a reduction reaction on the surface of the negative electrode, and the reduction products will deposit on the surface of the negative electrode to form an organic-inorganic composite product, i.e. SEI film, which is of great importance for the functioning of the electrochemical performance of lithium ions. However, the inventors have found in the course of actual research that during storage or use of the lithium-ion battery, the effective components of the formed SEI film inevitably dissolve into the electrolyte solution, which in turn leads to the damage of the structure of the SEI film, and greatly increases the direct contact area between the effective components and the electrolyte solution, thus the stability at the interphase between the SEI film and the electrolyte solution is greatly impaired, the occurrence of side reactions inside the battery (mainly the deposition of the by-products of electrolyte solution decomposition on the surface of the negative electrode and the gas generation of the electrolyte solution is intensified, and the cycling performance and safety performance of the battery are eventually deteriorated.

Particularly, when the inside of the battery is exposed to high temperature or high pressure, for example, during long-term high temperature storage or continuous high voltage charging, the SEI film dissolves in the electrolyte solution to a greater extent, the loss or depletion of the ingredients of the SEI film itself is more severe, and the adverse effects on the cycling performance and safety performance of the battery are more significant.

Particularly, when the battery is subjected to high temperature cycling for a plurality of times, due to the multiple expansion-contraction-expansion of the negative electrode material, the continuous dissolution and even shedding of the effective components of the SEI film are also intensified, further deteriorating the cycling performance and safety performance of the battery.

At the same time, the inventors have also found that If the effective components of the SEI film are generated only by the reaction inside the electrolyte solution, thereby forming the SEI film, on the one hand, the amount of the effective components generated by the reaction is less, the reaction rate is relatively slow, and the depleted SEI film can not be supplemented timely and sufficiently; and on the other hand, the reaction needs to consume the electrolyte solution and a large amount of lithium ions, resulting in a large amount of gas, which causes the accelerated degradation of the battery capacity and the damage to the safety performance of the battery.

Based on these findings and through extensive experimentation, the inventors have developed a method for preparing an SEI-like film component additive and an electrolyte solution comprising the SEI-like film component additive prepared by the method. With the electrolyte solution of the present application, the problem of the loss of the effective ingredients in the SEI film of the lithium-ion battery can be significantly improved, thereby significantly improving the cycling performance and safety performance of the battery.

Method for Preparing SEI-Like Film Component Additive

The present application provides a method for preparing an SEI-like film component additive, comprising the steps of:

Reacting an organic solution of lithium naphthalenide with a mixed solvent in an inert gas atmosphere to obtain a mixture containing an SEI-like film component additive, wherein, the mass ratio of the lithium naphthalenide in the organic solution of lithium naphthalenide to the mass of the mixed solvent is 2-8:1, and the mixed solvent comprises an organic solvent for a battery electrolyte solution;

drying the mixture in vacuum to obtain the SEI-like film component additive.

The preparation method of the present application is simple in operation and easy for industrial scale application.

It should be noted that the organic solution of lithium naphthalenide is a strongly reducing solution. Surprisingly, through extensive experimentation, the inventors have found that the reaction product of the organic solution of lithium naphthalenide with the mixed solvent described herein can effectively mitigate or avoid the damage of the SEI film after being added to the electrolyte solution, thus reducing the consumption of the electrolyte solution and active lithium, and in turn significantly improving the cycling performance and safety performance of the battery. For the convenience of description, the product resulting from the reaction of the organic solution of lithium naphthalenide with the mixed solvent described herein is referred to herein as an "SEI-like film component additive".

In addition, in the prior art, in order to prepare an SEI film, a generally adopted method is to add a film-forming component such as ethylene carbonate to the electrolyte solution in advance, and after the SEI film is damaged, the film-forming component undergoes a reduction reaction at the negative electrode to generate a new SEI film. While this method can supplement the damaged SEI film, the reaction of the film-forming component with the negative electrode still needs to consume the electrolyte solution and a large amount of lithium ions, resulting in a large amount of gas, which thereby causes the accelerated degradation of the battery capacity and the damage to the safety performance of the battery. In contrast, according to the method described in the present application, the SEI-like film component additive is prepared in advance outside the battery, and the above problems are well solved.

It should be noted that, in order to avoid the influence of oxygen in the air, the above method for preparing the SEI-like film component additive in the present application needs to be operated in a glove box filled with an inert gas atmosphere ($H_2O$ content is less than 100 ppm, and $O_2$ content is less than 100 ppm), wherein the inert gas is nitrogen, argon, or helium, preferably nitrogen or argon.

Various embodiments will be described below in terms of the general preparation procedures of the SEI-like film component additive of the present application.

Preparation of Organic Solvent Containing Naphthalene

In some embodiments, in order to prepare an organic solution containing naphthalene, an organic solvent is added into a reaction vessel, and then solid naphthalene is added to the solvent, and the naphthalene is completely dissolved by stirring at ambient temperature to obtain a white clear naphthalene-containing solution, the morphology of which is as shown in FIG. 1A.

In some embodiments, optionally the molar ratio of the organic solvent to the naphthalene is 1-5:1, and the organic solvent is selected from one or more of ethylene glycol dimethyl ether, ethylene glycol diethyl ether, ethylene glycol dipropyl ether, ethylene glycol methyl ethyl ether, and ethylene glycol methyl propyl ether.

Preparation of Organic Solution of Lithium Naphthalenide

In some embodiments, optionally in order to prepare a desirable organic solution of lithium naphthalenide, a lithium metal is added to the organic solution containing naphthalene in an inert gas atmosphere to react the naphthalene with the lithium metal, wherein the molar ratio of the naphthalene to the added lithium metal is 1-3:1 and during the reaction, the reaction temperature W2 and the reaction time S2 of the naphthalene with the lithium metal satisfy the condition of $23.59\ K\cdot min \leq \ln(W2+273.15) \times \ln S2 \leq 30.16 K\cdot min$; and the reaction is preferably carried out with sufficient stirring. The organic solution of lithium naphthalenide is prepared as a dark black solution with very strong reducibility, the morphology of which is as shown FIG. 1.B.

In some embodiments, optionally the reaction has a reaction temperature W2 of 45-60° C. and a reaction time S2 of 60-180 minutes.

In some embodiments, optionally the stirring condition is to control the rotational speed at 200-500 r/min (revolutions per minute).

Reaction of Organic Solution of Lithium Naphthalenide With Mixed Solvent

In some embodiments, optionally the organic solution of lithium naphthalenide is reacted with the mixed solvent to obtain the mixture containing the SEI-like film component additive, wherein, the mass ratio of the lithium naphthalenide in the organic solution of lithium naphthalenide to the mass of the mixed solvent is 2-8:1, the mixed solvent comprises an organic solvent for a battery electrolyte solution; and the mixture containing the SEI-like film component additive is obtained as a yellowish turbid liquid, the morphology of which is as shown in FIG. 1.C.

The types of the specific mixed solvent components in the mixed solvent are not limited in the present application, and reasonable combination can be carried out according to the specific components of the organic solvent used for the electrolyte solution in the actually corresponding lithium-ion battery. For example, the mixed solvent may be selected from one or more of the group consisting of cyclic esters, linear esters, cyclic sulfones and linear sulfones, and specifically may be selected from one or more of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some embodiments, optionally the mixed solvent is a mixture of ethylene carbonate, methyl ethyl carbonate, and dimethyl carbonate.

In some embodiments, optionally based on the mass of the mixed solvent, ethylene carbonate is used in an amount of 20-30%, methyl ethyl carbonate is used in an amount of 30-40%, and dimethyl carbonate is used in an amount of 30-50%, with the total amount being 100%.

In some embodiments, optionally the reaction temperature W1 and the reaction time S1 of the organic solution of lithium naphthalenide with the mixed solvent satisfy the condition of $23.59 K\cdot min \leq \ln(W1+273.15) \times \ln S1 \leq 30.16 K\cdot min$; and the reaction is preferably carried out with sufficient stirring.

In some embodiments, optionally the reaction temperature W1 of the organic solution of lithium naphthalenide with the mixed solvent is 45-60° C., and the reaction time S1 is 60-180 minutes.

In some embodiments, optionally the stirring condition is to control the rotational speed at 200-500 r/min.

In order to sufficiently reduce the mixed solvent by lithium naphthalenide, the reaction temperature and the reaction time are controlled so that $23.59 K\cdot min \leq \ln(W1+273.15) \times \ln S1 \leq 30.16 K\cdot min$.

Obtaining the SEI-Like Film Component Additive by Vacuum Drying

The reaction product resulting from the reaction of the organic solution of lithium naphthalenide with the mixed solvent is dried under vacuum at 60-80° C. to obtain the SEI-like film component additive product of the present application; optionally, the resulting SEI-like film component additive is a solid. Incorporating this product into any commercial electrolyte solution of lithium-ion battery can achieve the technical effects of improving the expansion rate of negative electrode as well as improving the high temperature storage performance and high temperature cycling performance.

The preparation method for preparing the SEI-like film component additive provided in the present application has the advantages of simple operation and readily availability of raw materials, and after the prepared SEI-like film component additive is added to the electrolyte solution, the increase rate of negative electrode sheet expansion as well as the high temperature cycling performance and the high temperature storage performance of the battery can be significantly improved.

Electrolyte Solution

A second aspect of the present application provides an electrolyte solution comprising the SEI-like film component additive prepared according to the method of the first aspect of the present application.

The electrolyte solution serves to conduct ions between the positive electrode sheet and the negative electrode sheet. The electrolyte solution of the present application comprises the SEI-like film component additive prepared according to the method of the present application, and compared with a conventional electrolyte solution without the SEI-like film component additive of the present application, the electrolyte solution of the present application can prevent the loss of effective ingredients caused by the dissolution of the SEI film on the negative electrode in the electrolyte solution during battery storage and use, and at the same time, the electrolyte solution can also timely supplement the lost or damaged SEI film with effective ingredients, thus the damaged parts of the SEI film are quickly and timely supplemented, thereby in turn significantly improving the undesirable situations such as decomposition of electrolyte solution, increased side reactions, large gas production, loss of active lithium and the like caused by SEI film damage, thus significantly improving the cycling performance and safety performance of the battery.

Particularly, when the battery is exposed to high temperature or high pressure, the high temperature or high pressure increases the solubility of the effective components of the SEI film in the electrolyte solution, thereby intensifying the loss of the effective ingredients of the SEI film. However, correspondingly the high temperature or high pressure also promotes the components in the electrolyte solution to re-form a new SEI film at a faster rate, and therefore when the electrolyte solution of the present application contains the SEI-like film component additive, those of the SEI-like film component additive will be immediately supplemented to form a new SEI film.

In addition, probably because the effective ingredients of the SEI-like film component additive are very similar to the effective ingredients in the real SEI film, in the electrolyte solution containing the SEI-like film component additive of the present application, the effective ingredients of the SEI film can substantially reach saturation or even supersaturation, so that even under severe conditions such as high temperature or high pressure, the dissolution rate of the SEI film inside the battery of the present application is still slower, and rupture is less likely to occur.

Particularly, when the battery is subjected to high temperature cycling and high voltage charging for a plurality of times, due to the multiple expansion-contraction-expansion of the negative electrode material, the continuous dissolution and even shedding of the effective components of the SEI film are intensified; however, since the electrolyte solution of the present application contains the SEI-like film component additive, the expansion of the negative electrode material can be suppressed to a certain extent, and the continuous dissolution and even shedding of the SEI film due to the expansion of the negative electrode can be effectively prevented, thereby improving the cycling performance and safety performance of the battery.

Extensive experimentation shows that the SEI-like film component additive in the electrolyte solution of the present application does not affect the functioning of the other ingredients in the electrolyte solution.

It should be noted that if the SEI-like film component additive is directly pre-coated on the surface of the negative electrode, it also helps to maintain the interfacial stability between the electrolyte solution and the surface of the negative electrode. However, from the viewpoint of being more in favor of the functioning of the performance of the negative electrode of the battery, if it is merely directly coated on the surface of the negative electrode, there may be cases where the SEI-like film component additive can not uniformly permeate/uniformly disperse inside the negative electrode film layer, therefore in the present application, it is preferred to add the SEI-like film component additive to the electrolyte solution. In the present application, by adding an appropriate amount of the SEI-like film component additive to the electrolyte solution, on the one hand, the damaged SEI film can be timely supplemented or restored, thereby improving the cycling performance and safety performance of the battery; and on the other hand, the SEI-like film component additive can be uniformly dispersed in the electrolyte solution, which helps to form a uniform and compact SEI film on the surface of the negative electrode.

In some embodiments, optionally the SEI-like film component additive is added in an amount of 0.05%-0.3% by mass of the electrolyte solution.

Through extensive experimentation, it is found that the content of the SEI-like film component additive in the electrolyte solution is very important for the functioning of the battery performance. When the content of the SEI-like film component additive in the electrolyte solution is less than 0.05%, it has little effects on improving the high temperature cycling performance and high temperature storage performance of the battery, this is because, on the one hand, when the content of the SEI-like film component additive is too low, the effective ingredients of the SEI film in the electrolyte solution can not reach saturation, thereby having no substantial effect on suppressing the dissolution of the SEI film on the negative electrode; and on the other hand, when the content of the SEI-like film component additive is too low, even if the damaged SEI film is supplemented, the amount of supplementation can not keep up with the amount of loss, so the effect of supplementing the SEI film with effective ingredients is not good either.

In contrast, when the content of the SEI-like film component additive in the electrolyte solution is higher than 0.3%, since the SEI-like film component additive contains relatively high molecular weight substances such as polycarbonate with a relatively high viscosity, if added in a larger amount, it will not only worsen the conductivity of the electrolyte solution, but also increase the resistance to the formation of the SEI film on the negative electrode by the SEI-like film component additive, thereby adversely affecting the cycling performance of the battery.

In some embodiments, optionally the electrolyte solution contains a lithium-supplying material, and the mass ratio of the added amount of the SEI-like film component additive to the lithium-supplying material is 0.5-5:100.

In some embodiments, optionally the lithium-supplying material can be selected from one or more of lithium hexafluorophosphate, lithium difluorophosphate, lithium tetrafluoroborate, lithium perchlorate, hexafluoroarsenate, lithium bis(fluorosulfonyl)imide, bis(trifluoromethanesulfonyl)imide, lithium trifluoromethanesulfonate, lithium difluoro(oxalato)borate, lithium bis(oxalate)borate, difluorophosphate, lithium difluoro bis(oxalato)phosphate, and lithium tetrafluoro(oxalato)phosphate; and more optionally, the lithium-supplying material is one or more of lithium hexafluorophosphate, lithium difluorophosphate, and lithium tetrafluoroborate.

It should be noted that the combination of the SEI-like film component additive in the electrolyte solution of the present application with a suitable amount of other substances in the electrolyte solution, such as the lithium-supplying material has better effects on improving the performance of the SEI film on the negative electrode and in turn improving the performance of the battery. For example, the SEI film on the negative electrode is a composite organic-inorganic network that enables the SEI film to have suitable ionic conductivity, suitable mechanical strength, suitable flexibility, and compactness.

Therefore, by adding the above-mentioned lithium-supplying material to the electrolyte solution of the present application, on the one hand, it helps to increase the quantity of active lithium ions in the electrolyte solution, thereby improving the cycling performance of the battery; and on the other hand, the lithium-supplying material as an inorganic substance helps to form a new SEI film by interacting with the SEI-like film component additive when the SEI film is damaged, thereby improving the battery performance.

The SEI-like film component additive in the electrolyte solution of the present application is mainly an organic component, primarily contributing such characteristics as flexibility, compactness, etc. to the SEI film, while the lithium-supplying material in the electrolyte solution of the present application primarily contributes such characteristics as ionic conductivity, mechanical strength, stiffness, etc. to the SEI film. Therefore, when the mass ratio of the SEI-like film component additive to the mass of the lithium-supplying material is less than 0.5:100, the relative content of the organic component in the newly formed SEI film is too low, resulting in poor flexibility and high stiffness of the film, and if the negative electrode has relatively severe expansion, the SEI film is prone to shedding or damage, thereby adversely affecting the high temperature storage performance and cycling performance of the battery. In contrast, when the mass ratio of the SEI-like film component additive to the mass of the lithium-supplying material is higher than 5:100, the newly formed SEI film has too many organic components and too few inorganic components, the newly formed SEI film is relatively compact, the quantity of lithium ions that can pass through the cross section of unit pore decreases, and the resistance to lithium ion transport is high, resulting in poor high temperature cycling performance of the battery.

In addition, when too many organic ingredients are contained in the newly formed SEI film, the thermoplasticity of the whole SEI film is increased, and the thermal stability of the SEI film as a whole is reduced, thus accelerating the dissolution or damage of the SEI film, causing side reactions inside the battery, and further deteriorating the high temperature cycling performance and storage performance of the battery.

In some embodiments, optionally the electrolyte solution also comprises other additive selected from one or more of fluoroethylene carbonate, vinylene carbonate, vinyl ethylene carbonate, and ethylene sulfate, and the mass of the other additive constitutes 0.5%-3% of the mass of the electrolyte solution.

The other additive introduced may further participate in the film formation on the surface of the negative electrode, and at the same time, it may participate in repairing the SEI film on the negative electrode during cycling. Through extensive experimentation, the inventors have found that after the SEI-like film component additives are used, the combined use of the above-mentioned additives can achieve a more excellent cycling effect, but they need to be used in controlled amounts within a certain range. If no any other additive is used at all, the film-forming effect of the SEI-like film component additive is insufficient to some extent; however, if too many of other additives are used, not only the extent to which the SEI-like film component additive participates in film-forming is affected, but also the SEI film becomes too thick, resulting in the lengthening of lithium ion transport path and affecting the cycling performance of the battery.

In some embodiments, additives other than those described above are optionally included in the electrolyte solution. For example, a negative electrode film-forming additive may be included, a positive electrode film-forming additive may also be included, and an additive capable of improving certain properties of the battery may further be included, such as an additive for improving the overcharging performance of the battery, an additive for improving the high temperature performance of the battery, and an additive for improving the low temperature performance of the battery, etc.

Lithium-Ion Battery

In an embodiment of the present application, there is provide a lithium-ion battery comprising a positive electrode sheet, a negative electrode sheet, a separator, and an electrolyte solution containing an SEI-like film component additive.

In the present application, the negative electrode sheet comprises a negative electrode current collector and a negative electrode film layer provided on at least one surface of the negative electrode current collector, wherein the negative electrode film layer comprises a negative electrode active material.

By way of example, the negative electrode current collector has two opposite surfaces in the direction of its own thickness, and the negative electrode film layer is provided on either or bath of the two opposite surfaces of the negative electrode current collector.

In the lithium-ion battery of the present application, the negative electrode current collector can be a metal foil or a composite current collector. For example, as the metal foil, a copper foil can be used. The composite current collector may comprise a polymer material substrate and a metal layer formed on at least one surface of the polymer material substrate. The composite current collector can be formed by forming the metal material (copper, copper alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), polyethylene (PE), etc.), although the present application is not limited to these materials.

In the negative electrode sheet of the present application, the negative electrode film layer generally comprises a negative electrode active material and an optional binder, an optional conductive agent and other optional auxiliaries, and is usually formed by coating a negative electrode paste and drying. The negative electrode paste is generally formed by dispersing the negative electrode active material as well as the optional conductive agent and the binder, etc. in a solvent and uniformly stirring. The solvent may be N-methyl pyrrolidone (NMP) or deionized water. By way of example, the conductive agent can be selected from one or more of superconducting carbon, acetylene black, carbon black, Ketjen black, carbon dot, carbon nanotube, graphene, and carbon nanofiber.

In some embodiments, optionally the negative electrode material can be coated by a method commonly used in the art for coating a negative electrode material. By way of example, the negative electrode material, the conductive agent, and the binder, etc. can be dissolved in the deionized water in accordance with a certain proportion, mixed uniformly to prepare the negative electrode paste, and then the negative electrode paste is uniform! coated on the negative electrode current collector in one or more portions. During multiple charge-discharge cycles of the battery, the negative electrode sheet expands due to repeated de-intercalation of lithium ions, thereby damaging the structure of the negative electrode, and adversely affecting the cycling performance and safety performance of the battery.

In some embodiments, optionally the increase rate of negative electrode sheet expansion is 2%-10%. Optionally, the negative electrode material on the negative electrode sheet comprises one or more of natural graphite, artificial graphite, mesocarbon microbead, hard carbon, soft carbon, silicon-carbon composite, lithium tin (Li—Sn) alloy, and lithium aluminum (Li—Al) alloy.

In some embodiments, optionally the Li—Sn alloy is a Li—Sn—O alloy.

In some embodiments, optionally the negative electrode material on the negative electrode sheet comprises one or more of silicon, Sn, SnO, $SnO_2$ and lithium metal.

For a lithium-ion battery, although metal and alloy negative electrode materials, and silicon-rich negative electrode materials or the like are advantageous in improving the fast charging performance of the battery after multiple charge-discharge cycles, they may increase the expansion rate of the negative electrode. Surprisingly, through experimentation, the inventors have found that when such negative electrodes are used in combination with the electrolyte solution containing the SEI-like film component additive of the present application, the increase rate of negative electrode expansion is significantly improved.

In some embodiments, optionally assuming that the mass percentage of the added amount of the SEI-like film component additive in the electrolyte solution is m1, and the mass of the negative electrode active material on a single-sided negative electrode current collector (in g/77 $mm^2$) is m2, then the ratio of m1 to m2 is 1.1-2.8 $(g/77\ mm^2)^{-1}$. Through extensive experimentation, the inventors have found that when the above-mentioned ratio is 1.1-2.8 $(g/77\ mm^2)^{-1}$, the combination of the content of the SEI-like film component additive in the electrolyte solution and the coating amount of the negative electrode material inside the same battery is reasonable, and the combination of the two items has a synergistic effect, which is beneficial to the full functioning of the high temperature storage performance and high temperature cycling performance of the lithium-ion battery.

When the above-mentioned ratio is too small, the coating amount of the negative electrode material on the negative electrode sheet is relatively large, while the content of the SEI-like film component additive in the corresponding electrolyte solution is relatively low. When the coating amount of the negative electrode material on the negative electrode sheet is too large, more of the SEI-like film component additive is needed for the timely supplementation of the SEI film components; and at this time, if the content of the SEI-like film component additive in the electrolyte solution is too low, the efficiency and quality of film formation on the negative electrode will be affected, thereby affecting the functioning of the electrochemical performance of the battery. In contrast, when the above-mentioned ratio is too large, there are more of the SEI-like film component additive, while the coating amount of the negative electrode material on the corresponding negative electrode sheet is less. At this time, an excessive amount of the SEI-like film component in the electrolyte solution deteriorates the conductivity of the electrolyte solution, thereby deteriorating the battery performance.

In the present application, the positive electrode sheet comprises a positive electrode current collector and a positive electrode material provided on at least one surface of the positive electrode current collector. By way of example, the positive electrode current collector has two opposite surfaces in the direction of its own thickness, and the positive electrode material is provided on either or both of the two opposite surfaces of the positive electrode current collector.

In the lithium-ion battery of the present application, the positive electrode current collector can be a metal foil or a composite current collector. For example, as the metal foil, an aluminum foil can be used. The composite current collector may comprise a polymer material substrate and a metal layer formed on at least one surface of the polymer material substrate. The composite current collector can be formed by forming the metal material (aluminum, aluminum alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), 1,3-propane sultone (PS), polyethylene (PE), etc.), although the present application is not limited to these materials.

In the present application, non-limiting examples of the positive electrode material include conventional positive electrode active materials useful for secondary batteries, such as positive electrode materials of lithium iron phosphate system or nickel-cobalt-manganese ternary system.

In some embodiments, optionally when the positive electrode material is one of those of lithium iron phosphate system, the charging cut-off voltage of the lithium-ion battery can reach 3.65-3.8V; and when the positive electrode material is one of those of nickel-cobalt-manganese ternary system, the charging cut-off voltage of the lithium-ion battery can reach 4.0-4.8V.

Surprisingly, the battery containing the SEI-like film component additive of the present application can effectively ameliorate the side reactions of the electrolyte solution at high voltage, and improve the cycling capacity retention rate and high temperature storage performance of the battery under high temperature and high pressure. For a battery, increasing the charge-discharge voltage is beneficial to the functioning of the capacity of the positive electrode active material of the battery, and increases the energy density of the battery; however, excessive charge-discharge voltage often leads to the side reaction of the decomposition of the electrolyte solution, thus deteriorating the cycling performance and safety performance of the battery. Through extensive experimentation and exploration, the inventors have found that a battery made from the electrolyte solution containing the SEI-like film component additive of the present application has good cycling performance and safety performance even at a higher voltage. Taking the case where lithium iron phosphate is the positive electrode active material as an example, the charging cut-off voltage of a conventional lithium iron phosphate battery is generally 3.6-3.65V, whereas the lithium-ion battery of the present application has good high temperature cycling performance and high temperature storage performance even at 3.8V (see FIG. 3.A-B for the performance diagram).

Figure 4:
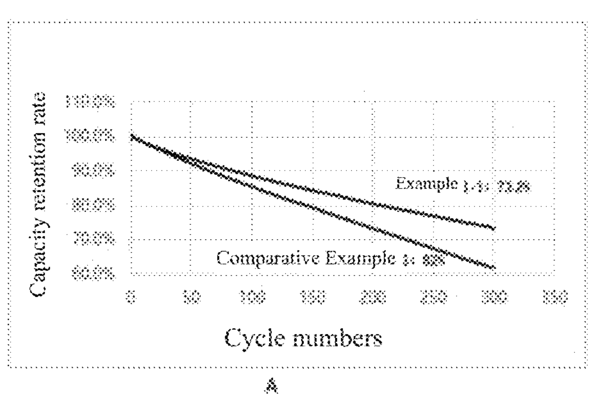
FIG. 4 is the 60° C. cycling performance diagram (FIG. 4.A) and the 60° C. storage performance diagram (FIG. 4.B) of a battery with a nickel-cobalt-manganese ternary layered material as the positive electrode active material at a voltage of 4.8V according to an embodiment of the present application.
Figure 4:
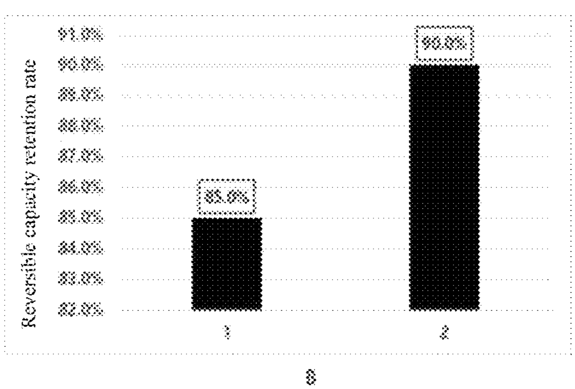

For ternary systems such as ternary layered materials, the upper voltage limit of a common ternary layered material is 4.0V-4.3V, and by increasing the upper voltage limit of the ternary layered material, the capacity and working voltage of the positive electrode material can be greatly increased, thereby greatly increasing the energy density of the lithium-ion battery. However, if merely the upper use limit is simply increased, as the electrochemical window of the electrolyte solution is relatively narrow, the high temperature storage performance and high temperature cycling performance of the battery will be greatly deteriorated. However, by using the SEI-like film component additive, the corresponding lithium-ion battery has good high temperature cycling performance and high temperature storage performance even at 4.8V (see FIG. 4. A-B for performance diagram).

Optionally, the positive electrode material also comprises a conductive agent. However, the type of the conductive agent is not particularly limited, and those skilled in the art can make a selection according to the actual needs. By way of example, the conductive agent for the positive electrode material can be selected from one or more of superconducting carbon, acetylene black, carbon black, Ketjen black, carbon dot, carbon nanotube, graphene, and carbon nanofiber.

The positive electrode sheet in the present application can be prepared according to the methods known in the art. The coating of the positive electrode material can be performed by a method similar to that for the coating of the negative electrode material. By way of example, the positive electrode active material, the conductive agent and the binder of the present application can be dispersed in a solvent (for example, N-methyl pyrrolidone (NMP)) to form a uniform positive electrode paste; the positive electrode paste is coated on the positive electrode current collector, and after oven drying, cold pressing and other procedures, the positive electrode sheet is obtained.

Separator

Lithium-ion batteries employing electrolyte solutions as well as some lithium-ion batteries employing solid electrolytes also include separators. A separator is provided between the positive electrode sheet and the negative electrode sheet, and functions to separate. The type of the separator is not particularly limited in the present application, and any well known structural porous separator having good chemical stability and mechanical stability can be selected. In some embodiments, the material of the separator can be selected from one or more of glass fiber, non-woven cloth, polyethylene, polypropylene, and polyvinylidene fluoride. The separator may be a single-layer film or a multilayer composite film, and is not particularly limited. When the separator is a multilayer composite film, the materials of each layer may be the same or different, and are not particularly limited.

In some embodiments, the positive electrode sheet, the negative electrode sheet, and the separator can be made into an electrode assembly by a winding process or a lamination process.

In some embodiments, the lithium-ion battery can also include an outer package. The outer package can be used to encapsulate the above-mentioned electrode assembly and electrolyte.

In some embodiments, the outer package of the lithium-ion battery can be a hard case, such as a hard plastic case, an aluminum case, a steel case, and the like. The outer package of the lithium-ion battery can also be a soft pack, such as a bag-type soft pack. The material of the soft pack can be a plastic, and examples as plastics include polypropylene (PP), polybutylene terephthalate (PBT) and polybutylene succinate (PBS).

Figure 5:
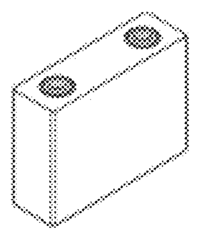
FIG. 5 is a schematic view of a lithium-ion battery according to an embodiment of the present application.

The shape of the lithium-ion battery is not particularly limited in the present application, and may be cylindrical, square or of any other shapes. For example, FIG. 5 is an example of lithium-ion battery 5 having a square structure.

Figure 6:
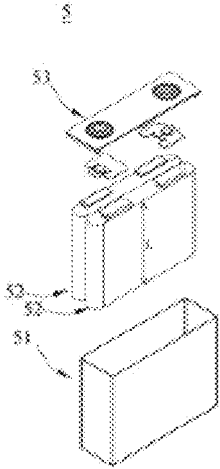
FIG. 6 is an exploded view of the lithium-ion batted according to the embodiment of the present application shown in FIG. 5.

In some embodiments, referring to FIG. 6, the outer package can include a case 51 and a cover plate 53. Here, the case 51 can include a bottom plate and a side plate connected to the bottom plate, with the bottom plate and the side plate enclosing to form an accommodating cavity. The case 51 has an opening communicating with the accommodating cavity, and the cover plate 53 can cover the opening to close the accommodating cavity. The positive electrode sheet, the negative electrode sheet, and the separator can be formed into an electrode assembly 52 via a winding process or a lamination process. The electrode assembly 52 is encapsulated within the accommodating cavity. The electrolyte solution impregnates the electrode assembly 52. The number of electrode assemblies 52 contained in the lithium-ion battery 5 can be one or more, and can be selected by those skilled in the art according to specific needs.

Battery Module

In some embodiments, lithium-ion batteries can be assembled into a battery module, the number of lithium-ion batteries contained in the battery module can be one or more, and the specific number can be selected by those skilled in the art according to the application and capacity, of the battery module.

Figure 7:
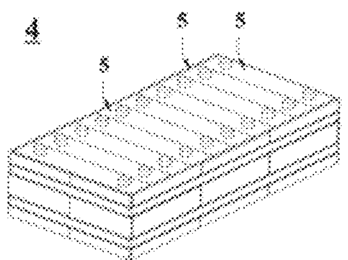
FIG. 7 is a schematic view of a battery module according to an embodiment of the present application.

FIG. 7 is an example of battery module 4. Referring to FIG. 7, in the battery module 4, a plurality of lithium-ion batteries 5 can be sequentially arranged along the length direction of the battery module 4. Of course, any other arrangement is also possible. The plurality of lithium-ion batteries 5 may further be fixed by fasteners.

Optionally, the battery module 4 can also include a housing having an accommodating space, in which the plurality of lithium-ion batteries 5 are accommodated.

Battery Pack

In some embodiments, the above-mentioned battery modules can also be assembled into a battery pack, and the number of battery modules contained in the battery pack can be selected by those skilled in the art according to the application and capacity of the battery pack.

Figure 8:
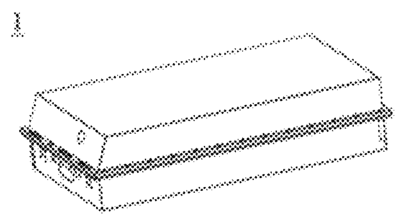
FIG. 8 is a schematic view of a battery pack according to an embodiment of the present application.
Figure 9:
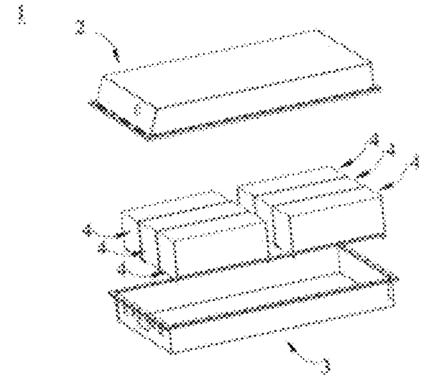
FIG. 9 is an exploded view of the battery pack according to the embodiment of the present application shown in FIG. 8.

FIGS. 8 and 9 are an example of battery pack 1. Referring to FIGS. 8 and 9, the battery pack 1 can include a battery box and a plurality of battery modules 4 provided in the battery box. The battery box includes an upper box 2 and a lower box 3, wherein the upper box 2 can cover the lower box 3, and forms an enclosed space for accommodating the battery module 4. The plurality of battery modules 4 can be arranged in the battery box in any manner.

Powered Device

In addition, the present application also provides a powered device comprising one or more of the lithium-ion battery, battery module, or battery pack provided by the present application. The lithium-ion battery, battery module, or battery pack can be used as a power source for the device, and can also be used as an energy storage unit for the device. The devices can be, but are not limited to, mobile devices (such as mobile phones, laptops etc.), electric vehicles (such as all-electric vehicles, hybrid electric vehicles, plug-in hybrid electric vehicles, electric bicycles, electric scooters, electric golf carts, electric trucks, etc.), electric trains, ships and satellites, energy storage systems, etc.

The lithium-ion battery, the battery module, or the battery pack can be selected as the powered device based on the usage requirements.

Figure 10:
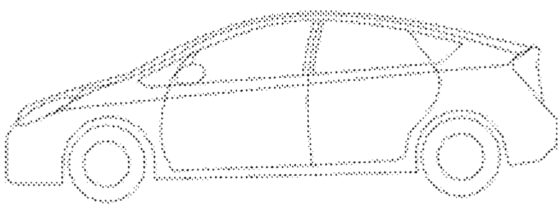
FIG. 10 is a schematic view of a powered device according to an embodiment of the present application.

FIG. 10 is an example of device. The device is a all-electric vehicle, a hybrid electric vehicle, or a plug-in hybrid electric vehicle, etc. For the device to meet the requirements of high power and high energy density for lithium-ion batteries, battery packs or battery modules can be used.

By way of another example, the device may be a mobile phone, a tablet computer, a laptop, etc. The device is generally required to be light and thin, and can use a lithium-ion battery as a power source.

EXAMPLES

Hereinafter, examples of the present application will be described. The examples described below are illustrative only for explaining the present application, and are not to be construed as limiting the present application. Where specific techniques or conditions are not specified in the examples, the techniques or conditions described in the literatures of the art or the product specifications are followed. Where manufacturers are not specified, the reagents or instruments used are conventional products commonly used in the art and are commercially available, if not specified, the content of each ingredient in the examples of the present application is based on the mass without water of crystallization.

The raw material sources involved in the examples of the present application are as follows:

Lithium iron phosphate ($LiFePO_4$, Tianjin Guoan Mengguli New Materials Science & Technology Co., Ltd.)

Ternary nickel-cobalt-manganese ($LiMO_2$, M is a Ni—Co—Mn solid solution, and the mass ratio thereof is 8:1:1)

Artificial graphite (Guangdong Kaijin New Energy Technology Co., Ltd.)

Separator (polypropylene film, Contemporary Amperex Technology Co., Ltd.)

N-methyl pyrrolidone (NMP, CAS: 872-50-4, purity≥99%, Shanghai Macklin Biochemical Co., Ltd.)

Polyvinylidene fluoride (CAS: 24937-79-9, molecular weight is between 800,000-1,500,000, Shanghai Macklin Biochemical Co., Ltd.)

Acetylene black (Guangdong Kaijin New Energy Technology Co., Ltd.)

Conductive carbon black (Guangdong Kaijin New Energy Technology Co., Ltd.)

Acrylate (CAS: 25067-02-1, purity≥99%, Shanghai Macklin Biochemical Co., Ltd.)

Ethylene carbonate (EC, purity≥99.5%, CAS: 96-49-1, Shanghai Macklin Biochemical Co., Ltd.)

Dimethyl carbonate (DMC, purity≥99.5%, CAS: 616-38-6, Shanghai Macklin Biochemical Co., Ltd.)

Methyl ethyl carbonate (EMC, purity≥99.5%, CAS: 623-53-0, Shanghai Macklin. Biochemical Co., Ltd.)

Ethylene glycol dimethyl ether (CAS: 110-71-4, purity≥99%, Shanghai Macklin Biochemical Co., Ltd.)

Solid naphthalene 91-20-3, purity≥99%, Shanghai Macklin Biochemical Co., Ltd.)

Lithium metal sheet (CAS: 7439-93-2. Shanghai Macklin Biochemical Co., Ltd.)

Potassium bromide (KBr, CAS: 7758-02-3, purity≥98%. Shanghai Macklin Biochemical Co., Ltd.)

Lithium hexafluorophosphate ($LiPF_6$, CAS: 21324-40-3, Guangzhou Tinci Materials Technology Co., Ltd.)

Lithium difluorophosphate ($LiPO_2F_2$, CAS: 24389-25-1, Guangzhou Tinci Materials Technology Co., Ltd.)

Lithium tetrafluoroborate ($LiBF_4$, CAS: 14283-07-9, Guangzhou Tinci Materials Technology Co., Ltd.)

Example 1-1

Preparation of Electrolyte Solution Containing SEI-Like Film Component Additive

The whole preparation process was carried out in a glove box filled with an inert atmosphere (filled with argon, with $H_2O$ being less than 100 ppm, and $O_2$ being less than 1.00 ppm):

After taking a beaker, 1 mol of pure solvent of ethylene glycol dimethyl ether was added to the beaker; 1 mol of solid naphthalene (calculated as pure naphthalene $C_{10}H_8$ with a purity of 100%) was added to the above solvent, and stirred at a rotational speed of 500 r/min for 3 hours at 50° C. to obtain an organic solution containing naphthalene;

1 mol of solid lithium metal (calculated as Li) was added to the above organic solution containing naphthalene, stirred at a rotational speed of 500 r/min for 2 h at 50° C. to completely dissolve the lithium sheet, and an organic solution of lithium naphthalenide was obtained;

At 25° C., ethylene carbonate (EC), methyl ethyl carbonate (EMC) and dimethyl carbonate (DMC) were mixed in a mass ratio of EC:EMC:DMC=30:30:40 to obtain a mixed solvent;

At 50 according to a mass ratio of the organic solution of lithium naphthalenide:the mixed solvent 10:1.20 g of the mixed solvent was slowly poured into 200 g of the organic solution of lithium naphthalenide, and reacted at a rotational speed of 300 r/min for 3 hours to obtain a mixture containing an SEI-like film component additive;

The above mixture was dried under vacuum at 60° C. for 2 h to obtain 10 g of solid SEI-like film component additive.

Preparation of Electrolyte Solution Containing SEI-Like Film Component Additive 300 g of ethylene carbonate (EC), 300 g of methyl ethyl carbonate (EMC) and 400 g of dimethyl carbonate (DMC) were mixed at 25° C. to obtain a mixed solvent;

After taking 91.65 g of the above mixed solvent, 0.1 g of the SEI-like film component additive, 2 g of fluoroethylene carbonate and 6.25 g of lithium hexafluorophosphate (calculated as $LiPF_6$) were added thereto, and after stirring to dissolve, the electrolyte solution shown in Example 1-1 was obtained.

Preparation of Positive Electrode Sheet

A positive electrode active material lithium iron phosphate (calculated as $LiFePO_4$) material, a binder polyvinylidene fluoride, a conductive acetylene black, and N-methyl pyrrolidone (NMP) were mixed in a weight ratio of 48:1:1:50, and stirred uniformly by a vacuum stirrer to obtain a positive electrode paste; the positive electrode paste was uniformly coated on one side of an aluminum foil with a thickness of 12 μm, and then subjected to oven drying, cold pressing and slitting to obtain the positive electrode sheet of Example 1-1.

Preparation of Negative Electrode Sheet

A negative electrode material artificial graphite, a conductive agent carbon black, a binder acrylate and deionized water were mixed uniformly in a weight ratio of 48:1:1:50, and stirred uniformly by a vacuum stirrer to obtain a negative electrode paste; the negative electrode paste was uniformly coated on one side of a copper foil with a thickness of 8 μm, with coating mass being 0.008 g/77 $mm^2$, and then subjected to oven drying, cold pressing and slitting to obtain the negative electrode sheet of Example 1-1.

Separator

A polypropylene film was used as the separator.

Preparation of Lithium-Ion Battery

The positive electrode sheet, the separator and the negative electrode sheet of Example 1-1 were stacked in sequence, so that the separator was positioned between the positive electrode sheet and the negative electrode sheet and functioned to separate, and then a bare cell was obtained by winding, a tab was welded to the bare cell, the bare cell was put into an aluminum case, baked at 80° C. to remove water, and then 12 g of the above-mentioned electrolyte solution containing the SEI-like film component additive was injected, and an uncharged battery was obtained after sealing. The uncharged battery then went through procedures such as standing, hot and cold pressing, forming, reshaping and capacity testing successively to obtain the lithium-ion battery product of Example 1.

Examples 1-2 to 1-7

For Examples 1-2 to 1-7, except that the SEI-like film component additive was added in an amount of 0.15%, 0.2%, 0.25%, 0.3%, 0.05% and 035% by mass of the electrolyte solution, respectively, the other steps were the same as those in Example 1-1.

Examples 2-1 to 2-10

For Examples 2-1 to 2-10, except that the lithium-supplying material was changed to $LiPF_6$ and $LiPO_2F_2$ (the molar ratio of $LiPF_6$ to $LiPO_2F_2$ was 1:1), the other additive was changed from fluoroethylene carbonate to vinyl ethylene carbonate, and the mass ratio of the added amount of the SEI-like film component additive to the lithium-supplying materials was changed to 0.5:100, 0.8:100, 1.6:100, 2.4:100, 3.2:100, 4.0:100, 4.8:100, 5:100, 0.1:100, 6:100 respectively, the other steps were the same as those in Examples 1-3.

Examples 3-1 to 3-8

For Examples 3-1 to 3-8, except that the lithium-supplying material was changed to $LiPF_6$, $LiPO_2F_2$ and $LiBF_4$ (the molar ratio of $LiPF_6$, $LiPO_2F_2$ and $LiBF_4$ was 1:1:1), the other additive was changed from fluoroethylene carbonate to ethylene sulfate, and the mass percentage of the other additive in the electrolyte solution is changed to 0.5%, 1%, 1.5%, 2%, 2.5%, 3%, 0% and 5%, respectively, the other steps were the same as those in Examples 1-3.

Examples 4-1 to 4-6

For Examples 4-1 to 4-6, except that in the steps of [Preparation of negative electrode sheet], the coating mass was changed from 0.008 g/77 $mm^2$ to 0.01 g/77 $m^2$, 0.01 g/77 $mm^2$, 0.008 g/77 $mm^2$, 0.008 g/77 $mm^2$, 0.008 g/77 $mm^2$ and 0.008 g/77 $mm^2$, and the mass percentage content of the SEI-like film component additive in the electrolyte solution was 0.01%, 0.01%, 0.012%, 0.016%, 0.0224% and 0.024%, respectively, the other steps were the same as those in Example 1-1.

Comparative Example 1

The electrolyte solution contained 30 parts by mass of ethylene carbonate (EC), 30 parts by mass of methyl ethyl carbonate, and 40 parts by mass of dimethyl carbonate (DMC), and the concentration of lithium hexafluorophosphate (calculated as $LiPF_6$) in the electrolyte solution was 0.5 mol/L.

Other steps were the same as those in Example 1-1.

Relevant Parameters and Battery Performance Test

1. Test of Increase Rate of Negative Electrode Expansion

At 60° C., the lithium-ion battery corresponding to Example 1-1 was charged to 3.65V at a constant current of 1 C, aid then charged at constant voltage to a current of 0.05 C; the battery at this time was disassembled, the negative electrode part was taken out separately; and the thickness hi of the negative electrode was measured with a vernier caliper; for another lithium-ion battery produced in the same batch, after 300 continuous charge-discharge cycles (cycling conditions: charging at a constant current of 1 C to 3.65V, then charging at a constant voltage of 3.65V to a current of 0.05 C, standing for 5 min, and then discharging at a constant current of 1 C to 2.5V), the battery charging was continued at 1 C to 3.65V, and the battery was charged at a constant voltage to a current of 0.05 C; the battery at this time was disassembled, the negative electrode part was taken out separately, and the thickness h2 of the negative electrode was measured with a vernier caliper, and the increase rate of negative electrode expansion=[(h2−h1)/h1]×100%. The test procedures for the comparative example and other examples were the same as above. The data of increase rate of negative electrode expansion in Table 1 were obtained.

2. Cycling Performance Test at 60° C.

(1) Cycling Performance Test of Lithium-Ion Battery at 60° C. and a Full Charge Voltage of 3.65V Taking Example 1-1 as an example, the procedures for testing battery capacity retention rate were as follows: at 60° C., the battery corresponding to Example 1-1 was charged at a constant current of 1 C to 3.65V, then charged at a constant voltage of 3.65V to a current of 0.05 C, stood for 5 min, and then discharged at a constant current of 1 C to 2.5V, and the obtained capacity was recorded as initial capacity C0. The above steps were repeated for the same battery above, and counting was started at the same time; the discharge capacity Cn of the battery after the nth cycle was recorded, then the battery capacity retention rate after each cycle Pn=Cn/C0*100%; with the 100 point values of $P_1$, $P_2$ . . . $P_{300}$ $_a$s the ordinates, and the corresponding cycle numbers as the abscissas, a graph of battery capacity retention rate vs cycle number of Example 1-1 was obtained as shown in FIG. 7.A.

During the test, the first cycle corresponded to n=1, the second cycle corresponded to n=2, . . . and the 300th cycle corresponded to n=300. The data of battery capacity retention rate corresponding to Example 1-1 in Table 1 was the data measured after 300 cycles under the above test conditions, that is, the value of $P_{300}$. The test procedures for the comparative example and other examples were the same as above. The data of 60° C. cycling capacity retention rate in Table 1 were obtained.

Figure 3:
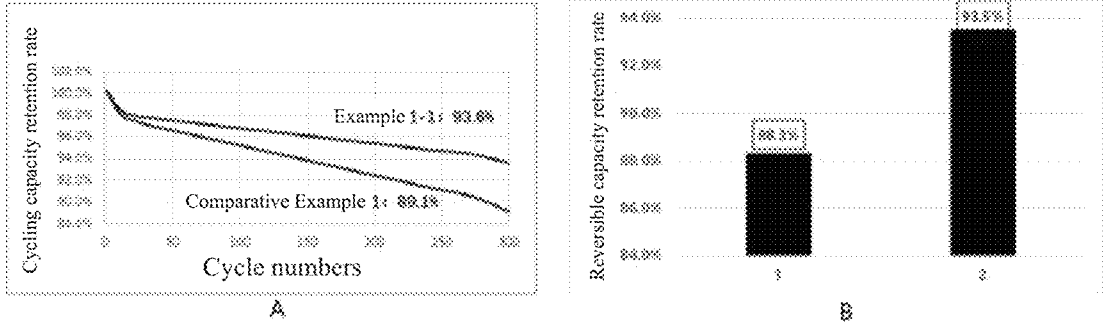
FIG. 3 is the 60° C. cycling performance diagram (FIG. 3.A) and 60° C. storage performance diagram (FIG. 3.B) of the batteries corresponding to the electrolyte solutions of Example 1-1 and Comparative Example 1 of the present application at 3.8V.

(2) Cycling Performance Test of Lithium-Ion Battery at 60° C. and a Full Charge Voltage of 3.8V Taking Example 1-1 as an example, except that the full charge voltage was changed from 3.65V to 3.8V, the other test procedures were the same as those of (1), and panel A of FIG. 3 of the present application was obtained.

3. Storage Performance Test at 60° C.

(1) Storage Performance Test of Lithium-Ion Battery at 60° C. and a Full Charge Voltage of 3.65V Taking Example 1-1 as an example, the procedures for testing battery high temperature reversible capacity retention rate were as follows: at 25° C., the battery corresponding to Example 1-1 was charged at a constant current of 0.5 C to 3.65V, then charged at a constant voltage of 3.65V to a current of 0.05 C, and after standing for 5 min, the battery was discharged at a constant current of 0.5 C to 2.5V, and the discharge capacity at this time was recorded as initial capacity C0.

The above battery was further charged at a constant current of 0.5 C to 3.65V, and then charged at a constant voltage of 3.65V to a current of 0.05 C, and then the battery was put into a thermostat at 60° C., and stored for 60 days before being taken out. The battery that was taken out was placed in an atmospheric environment at 25° C., and after the temperature of the lithium-ion battery completely dropped to 25° C., the lithium-ion battery was discharged at a constant current of 0.5 C to 2.5V (fully discharged), and then charged at a constant current of 0.5 C to 3.65V, and finally the lithium-ion battery was discharged at a constant current of 0.5V to 2.5V; the discharge capacity at this time was C1, then the high temperature reversible capacity retention rate of the battery after 60 days of storage is M=C1/C0×100%. The test procedures for the comparative example and other examples were the same as above, and the data of 60° C. storage reversible capacity retention rate in Table 1 were obtained.

(2) Storage Performance Test of Lithium-Ion Battery at 60° C. and a Full Charge Voltage of 3.8V Taking Example 1-1 as an example, except that the full charge voltage was changed from 3.65V to 3.8V, the other test procedures were the same as those of (1), and panel B of FIG. 3 of the present application was obtained.

Note: when the positive electrode active material of the lithium-ion battery of the present application is a nickel-cobalt-manganese ternary layered material, the present application mainly focuses on its 60° C. cycling performance test and its 60° C. cycling performance test at a full charge voltage of 4.8V. See panel A and panel B of FIG. 4 for the measured data.

TABLE 1

Relevant parameters and performance list of the lithium-ion batteries of Examples and Comparative example

| | Electrolyte solution containing SEI-like film component additive | | | | | Battery performance | | |
|---|---|---|---|---|---|---|---|---|
| | Mass percentage m1 (%) of the added amount of SEI-like film component additive in electrolyte solution | Mass ratio of the added amount of SEI-like film component additive to lithium-supplying material | | Mass percentage content of other additive in electrolyte solution | | | | |
| Example No. | | Lithium-supplying material | Ratio | Other additive | Content (wt %) | Increase rate of negative electrode expansion (%) | 60° C. cycling capacity retention rate (%) | 60° C. storage reversible capacity retention rate (%) |
| Example 1-1 | 0.1% | $LiPF_6$ | 1.6:100 | fluoroethylene carbonate | 2% | 14.1% | 94.8% | 96.1% |
| Example 1-2 | 0.15% | $LiPF_6$ | 1.6:100 | fluoroethylene carbonate | 2% | 13.6% | 95.2% | 97.3% |
| Example 1-3 | 0.2% | $LiPF_6$ | 1.6:100 | fluoroethylene carbonate | 2% | 13.2% | 96.1% | 97.9% |
| Example 1-4 | 0.25% | $LiPF_6$ | 1.6:100 | fluoroethylene carbonate | 2% | 13.1% | 95.6% | 97.1% |
| Example 1-5 | 0.3% | $LiPF_6$ | 1.6:100 | fluoroethylene carbonate | 2% | 14.2% | 95.1% | 96.5% |
| Example 1-6 | 0.05% | $LiPF_6$ | 1.6:100 | fluoroethylene carbonate | 2% | 14.7% | 94.1% | 95.3% |
| Example 1-7 | 0.35% | $LiPF_6$ | 1.6:100 | fluoroethylene carbonate | 2% | 14.9% | 93.1% | 94.9% |
| Example 2-1 | 0.2% | $LiPF_6$, $LIPO_2F_2$ | 0.5:100 | vinyl ethylene carbonate | 2% | 13.8% | 94.9% | 95.7% |
| Example 2-2 | 0.2% | $LiPF_6$, $LiPO_2F_2$ | 0.8:100 | vinyl ethylene carbonate | 2% | 13.7% | 95.1% | 96.2% |
| Example 2-3 | 0.2% | $LiPF_6$, $LiPO_2F_2$ | 1.6:100 | vinyl ethylene carbonate | 2% | 13.4% | 96.3% | 98.0% |
| Example 2-4 | 0.2% | $LiPF_6$ | 2.4:100 | vinyl ethylene carbonate | 2% | 13.3% | 95.0% | 97.1% |
| Example 2-5 | 0.2% | $LiPF_6$, $LiPO_2F_2$ | 3.2:100 | vinyl ethylene carbonate | 2% | 13.3% | 94.7% | 96.8% |
| Example 2-6 | 0.2% | $LiPF_6$, $LiPO_2F_2$ | 4.0:100 | vinyl ethylene carbonate | 2% | 13.1% | 94.4% | 95.7% |
| Example 2-7 | 0.2% | $LiPF_6$, $LiPO_2F_2$ | 4.8:100 | vinyl ethylene carbonate | 2% | 12.9% | 94.1% | 95.4% |
| Example 2-8 | 0.2% | $LiPF_6$, $LiPO_2F_2$ | 5:100 | vinyl ethylene carbonate | 2% | 12.8% | 94% | 95.3% |
| Example 2-9 | 0.2% | $LiPF_6$, $LIPO_2F_2$ | 0.1:100 | vinyl ethylene carbonate | 2% | 17.7% | 92.3% | 92.7% |
| Example 2-10 | 0.2% | $LiPF_6$, $LiPO_2F_2$ | 6:100 | vinyl ethylene carbonate | 2% | 16.3% | 92.4% | 92.5% |
| Example 3-1 | 0.2% | $LiPF_6$, $LiPO_2F_2$ and $LiBF_4$ | 1.6:100 | Ethylene sulfate | 0.5% | 14.7% | 95.5% | 96.9% |
| Example 3-2 | 0.2% | $LiPF_6$, $LiPO_2F_2$ and $LiBF_4$ | 1.6:100 | Ethylene sulfate | 1% | 14.3% | 95.9% | 97.3% |
| Example 3-3 | 0.2% | $LiPF_6$, $LiPO_2F_2$ and $LiBF_4$ | 1.6:100 | Ethylene sulfate | 1.5% | 14.8% | 96.4% | 97.7% |
| Example 3-4 | 0.2% | $LiPF_6$, $LiPO_2F_2$ and $LiBF_4$ | 1.6:100 | vinyl ethylene carbonate | 2% | 13.3% | 96.2% | 97.9% |

TABLE 1-continued

Relevant parameters and performance list of the lithium-ion batteries of Examples and Comparative example

| Example No. | Electrolyte solution containing SEI-like film component additive: Mass percentage m1 (%) of the added amount of SEI-like film component additive in electrolyte solution | Mass ratio of the added amount of SEI-like film component additive to lithium-supplying material: Lithium-supplying material | Ratio | Mass percentage content of other additive in electrolyte solution: Other additive | Content (wt %) | Battery performance: Increase rate of negative electrode expansion (%) | 60° C. cycling capacity retention rate (%) | 60° C. storage reversible capacity retention rate (%) |
|---|---|---|---|---|---|---|---|---|
| Example 3-5 | 0.2% | $LiPF_6$, $LiPO_2F_2$ and $LiBF_4$ | 1.6:100 | Ethylene sulfate | 2.5% | 13.7% | 95.7% | 97.3% |
| Example 3-6 | 0.2% | $LiPF_6$, $LiPO_2F_2$ and $LiBF_4$ | 1.6:100 | Ethylene sulfate | 3% | 13.9% | 95.1% | 96.9% |
| Example 3-7 | 0.2% | $LiPF_6$, $LiPO_2F_2$ and $LiBF_4$ | 1.6:100 | Ethylene sulfate | 0% | 14.7% | 92.3% | 92.7% |
| Example 3-8 | 0.2% | $LiPF_6$, $LIPO_2F_2$ and $LiBF_4$ | 1.6:100 | Ethylene sulfate | 5% | 14.8% | 92.4% | 92.5% |
| Comparative Example 1 | 0 | $LiPF_6$ | 1.6:100 | fluoroethylene carbonate | 2% | 15.4% | 90.2% | 90.8% |

Note:
in Examples 2-1 to 2-10, the molar ratio of different lithium-supplying materials was 1:1; in Examples 3-1 to 3-8, the molar ratio of different lithium-supplying materials was 1:1:1

TABLE 2

Relevant parameters and performance list of the lithium-ion batteries of Examples

| Example No. | m1 (%) | m2 (g/77 $mm^2$) | $\frac{m1}{m2}$ $(g/77\ mm^2)^{-1}$ | Mass ratio of the added amount of SEI-like film component additive to lithium-supplying material: Lithium-supplying material | Ratio | Increase rate of negative electrode expansion (%) | 60° C. cycling capacity retention rate (%) | 60° C. storage capacity retention rate (%) |
|---|---|---|---|---|---|---|---|---|
| Example 4-1 | 0.01 | 0.010 | 1 | $LiPF_6$ | 1.6:100 | 15.1 | 92.1 | 93.1 |
| Example 4-2 | 0.01 | 0.010 | 1.1 | $LiPF_6$ | 1.6:100 | 14.5 | 93.6 | 95.1 |
| Example 4-3 | 0.012 | 0.008 | 1.5 | $LiPF_6$ | 1.6:100 | 14.1 | 94.8 | 96.0 |
| Example 4-4 | 0.016 | 0.008 | 2.0 | $LiPF_6$ | 1.6:100 | 14.0 | 94.5 | 95.7 |
| Example 4-5 | 0.0224 | 0.008 | 2.8 | $LiPF_6$ | 1.6:100 | 14.3 | 94.2 | 95.1 |
| Example 4-6 | 0.024 | 0.008 | 3.0 | $LiPF_6$ | 1.6:100 | improvement is not obvious | 93.9 | 94.5 |

As can be seen according to Table 1, the high temperature cycling retention rate and the high temperature storage capacity retention rate of the lithium-ion batteries corresponding to all the above Examples were significantly higher than those of Comparative Example 1, at the same time, the increase rates of negative electrode expansion in all the Examples were less than that in Comparative Example 1.

A comprehensive comparison of Examples 1-1 to 1-7 shows that when the SEI-like film component additive was added in an amount of 0.1%-0.3% by mass of the electrolyte solution, the high temperature cycling retention rate of the lithium-ion battery was higher less than 94.8%), the lithium-ion battery also had a higher high temperature storage capacity (not less than 96.1%), and at the same time, the negative electrode of the lithium-ion battery also had a lower increase rate of negative electrode expansion (not more than 14.1%). However, when the SEI-like film component additive was added in an amount of less than 0.1% (Examples 1-6) or more than 0.3% (Examples 1-7) by mass of the electrolyte solution, the improvements of the high temperature cycling performance, the high temperature storage performance and the expansion of the negative electrode of the lithium-ion battery were not significant.

A comprehensive comparison of Examples 2-1 to 2-10 shows that when the mass ratio of the added amount of the SEI-like film component additive to the lithium-supplying material was in a range of 0.5-5:100, the high temperature cycling retention rate of the lithium-ion battery was higher (not less than 94%), the lithium-ion battery also had a higher high temperature storage capacity (not less than 95.3%), and at the same time, the negative electrode of the lithium-ion battery also had a lower increase rate of negative electrode expansion (not more than 14.1%). However, when the mass ratio of the added amount of the SEI-like film component additive to the lithium-supplying material was less than 0.5:100 (Examples 2-9) or more than 5:100 (Examples 2-10), the improvements of the high temperature cycling performance, the high temperature storage performance and the expansion of the negative electrode of the lithium-ion battery were not significant.

A comprehensive comparison of Examples 3-1 to 3-8 shows that in the case where the electrolyte solution contained the SEI-like film component additive, when the content of the other additive in the electrolyte solution was in a range of 0.5%-3%, the high temperature cycling retention rate of the lithium-ion battery was higher (not less than 95.1%), and the lithium-ion battery also had a higher high temperature storage capacity (not less than 96.9%). However, when the content of the other additive in the electrolyte solution was less than 0.5% (Examples 3-7) or more than 3% (Examples 3-8), the improvements of the high temperature cycling performance and the high temperature storage performance of the lithium-ion battery were not significant.

A comprehensive comparison of Examples 4-1 to 1-6 shows that when the ratio of m1 to m2 was in a range of 1.1-2.8 $(g/77\ mm^2)^{-1}$, the negative electrode expansion of the lithium-ion battery was significantly improved, the high temperature cycling retention rate of the lithium-ion battery was higher, and the lithium-ion battery also had a higher high temperature storage capacity. However, when the ratio was less than 1.1 or more than 2.8, the increase rate of negative electrode expansion, the high temperature cycling performance and the high temperature storage performance of the battery were not significantly improved.

What is claimed is:

1. A method for preparing a battery comprising a negative electrode sheet and an electrolyte solution, the method comprising:

reacting an organic solution of lithium naphthalenide with a mixed solvent in an inert gas atmosphere to obtain a mixture containing an SEI-like film component additive, wherein, a mass ratio of the lithium naphthalenide in the organic solution of lithium naphthalenide to the mixed solvent is 2-8:1, and the mixed solvent comprises ethylene carbonate, methyl ethyl carbonate, and dimethyl carbonate, a reaction temperature W1 of the organic solution of lithium naphthalenide with the mixed solvent is 45° C. to 60° C., and a reaction time S1 is 60 minutes to 180 minutes;

drying the mixture in vacuum to obtain SEI-like film component additive as a solid, a temperature at which the mixture is dried under vacuum is 60° C. to 80° C.;

dissolving the SEI-like film component additive in a non-aqueous solvent to form an electrolyte solution, adding a lithium-supplying material to the electrolyte solution, wherein the lithium-supplying material comprises at least one of lithium hexafluorophosphate, lithium difluorophosphate, and lithium tetrafluoroborate, a mass ratio of the SEI-like film component additive to the lithium-supplying material is 0.5-5:100, adding an additive in a mass of 0.5%-3% of a total mass of the electrolyte solution, the additive is selected from one or more of fluoroethylene carbonate, vinylene carbonate, vinyl ethylene carbonate, and ethylene sulfate, wherein the SEI-like film component additive is 0.1% to 0.3%, based on a total weight of the electrolyte solution, preparing a negative electrode sheet, wherein the negative electrode sheet comprises a negative electrode film layer, the negative electrode film layer comprises a negative electrode active material, and the negative electrode active material comprises one or more of natural graphite, artificial graphite, mesocarbon microbead, hard carbon, soft carbon, silicon-carbon composite, lithium-tin alloy and lithium-aluminum alloy, wherein a mass percentage content of the SEI-like film component additive in the electrolyte solution is m1, a mass of the negative electrode active material on a single-sided negative electrode current collector is m2 with a unit of $g/77\ mm^2$, a ratio of m1 to m2 is 1.1-2.8 $(g/77\ mm^2)^{-1}$.

2. The preparation method according to claim 1, wherein the mixed solvent further comprises one or more of cyclic esters, linear esters, cyclic sulfones and linear sulfones.

3. The method according to claim 1, wherein based on a total mass of the mixed solvent, the ethylene carbonate is in an amount of 20%-30%, the methyl ethyl carbonate is in an amount of 30%-40%, and the dimethyl carbonate is in an amount of 30%-50%, with a total amount being 100%.

4. The method according to claim 1, wherein a reaction temperature W1 and a reaction time S1 of the organic solution of lithium naphthalenide with the mixed solvent satisfy $23.59K\cdot mins \leq \ln(W1+273.15)\times \ln S1 \leq 30.16K\cdot min$; and the reaction is carried out with sufficient stirring.

5. The method according to claim 1, further comprising preparing the organic solution of lithium naphthalenide, wherein preparing the organic solution of lithium naphthalenide further comprises:

adding a lithium metal to an organic solution containing naphthalene in an inert gas atmosphere to react the naphthalene with the lithium metal, wherein a molar ratio of the naphthalene to the lithium metal is 1-3:1, and a reaction temperature W2 and a reaction time S2 of the naphthalene with the lithium metal satisfy $23.59 K\cdot mins \leq \ln(W2+273.15)\times \ln S2 \leq 30.16 K\cdot min$; and the reaction is carried out with sufficient stirring.

6. The method according to claim 5, wherein the reaction temperature W2 is 45-60° C., and the reaction time S2 is 60-180 minutes.

7. The method according to claim 5, wherein the organic solution contains an organic solvent and naphthalene, a molar ratio of the organic solvent to the naphthalene is 1-5:1, and the organic solvent is selected from one or more of ethylene glycol dimethyl ether, ethylene glycol diethyl ether, ethylene glycol dipropyl ether, ethylene glycol methyl ethyl ether, and ethylene glycol methyl propyl ether.

8. A lithium-ion battery comprising a positive electrode sheet, a separator, the negative electrode sheet prepared according to claim 1, and the electrolyte solution prepared according to claim 1.

9. A battery module comprising the lithium-ion battery according to claim 8.

10. A battery pack comprising the lithium-ion battery according to claim 8 or the battery module according to claim 9.

11. A powered device comprising one or more of the lithium-ion battery according to claim 8 or the battery module according to claim 9 or the battery pack according to claim 10, wherein the lithium-ion battery or the battery module or the battery pack is used as a power source for the powered device or an energy storage unit for the powered device.

* * * * *